TELEVISION RECEIVER WITH INSTANT-ON AND AUTOMATIC DEGAUSSING
Filed Aug. 8, 1966
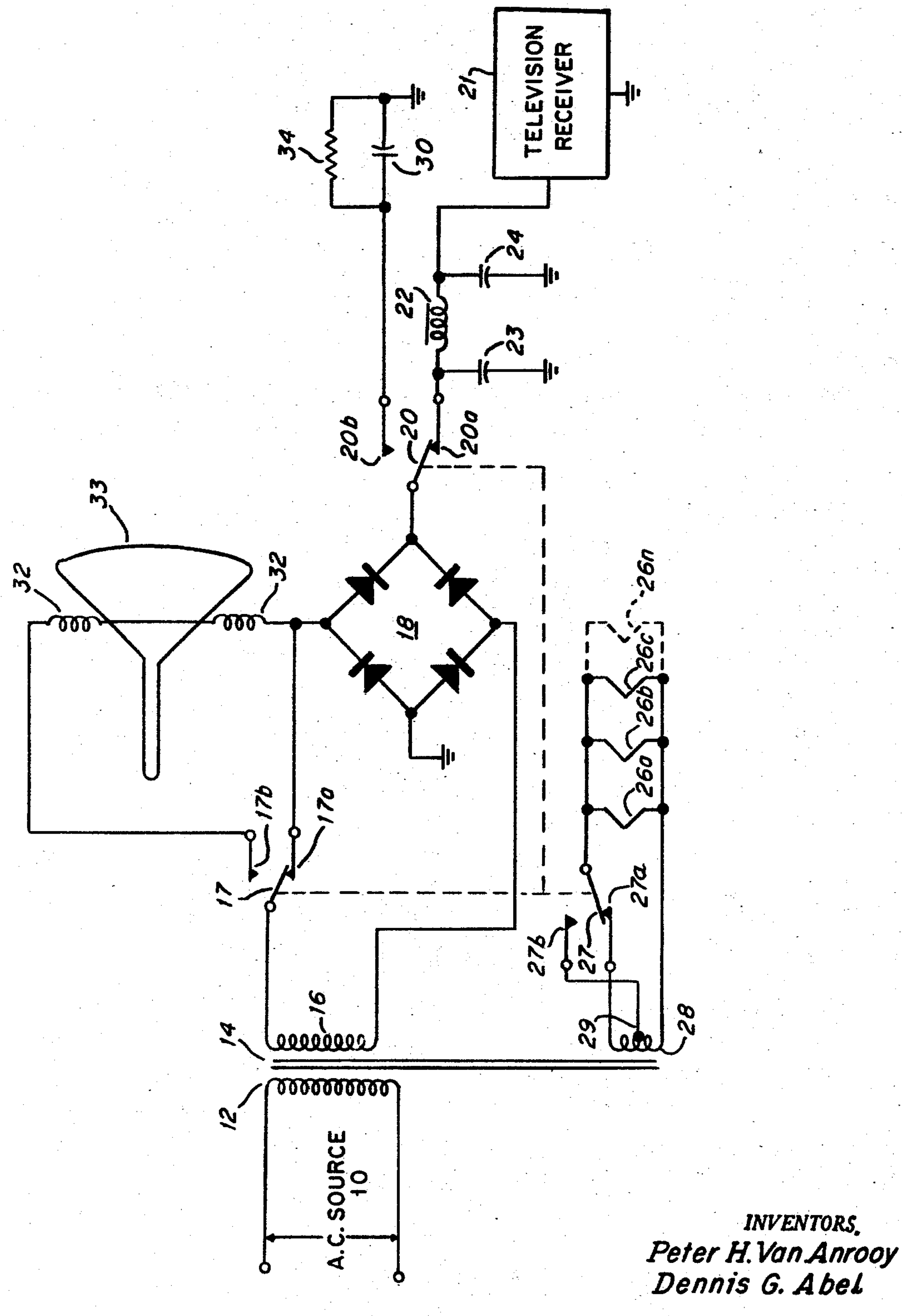
INVENTORS.
Peter H. Van Anrooy
Dennis G. Abel
ATTY.

United States Patent Office 3,344,307
Patented Sept. 26, 1967

3,344,307

TELEVISION RECEIVER WITH INSTANT-ON AND AUTOMATIC DEGAUSSING

Peter H. Van Anrooy and Dennis G. Abel, Itasca, Ill., assignors to Admiral Corporation, Chicago, Ill., a corporation of Delaware Filed Aug. 8, 1966, Ser. No. 571,038
14 Claims. (Cl. 315—8)

This invention relates in general to color television receivers, and in particular to color television receivers capable of substantially instant-on operation and having picture tubes susceptible of external magnetic fields. More particularly, this invention relates to extremely simple, effective, and more economical means for automatically neutralizing the magnetic fields which may develop in and around the picture tube of a color television receiver which is capable of substantially instant-on operation.

It is well-known that the paths of the electron beams in a three gun picture tube are very critical and extremely sensitive to external magnetic influences. These external magnetic influences may include the magnetic fields induced in components within the picture tube such as the mask, and those adjacent the tube such as the shield and chassis. The effect on the picture tube is to alter the electron beam landings on the phosphor screen which causes color contamination, impurities and in extreme cases, completely wrong colors. The components typically become magnetized by the receiver being moved through the earth's magnetic field, or being physically associated with devices creating a magnetic field such as electric motors used in many home appliances.

After a picture tube has become magnetized and the electron beam landings have been displaced, the most obvious method of correcting the problem is to demagnetize the affected components. During the early years of commercial color television, demagnetizing, commonly called degaussing, required the specialized services and equipment of a competent television repairman. Since this subjected the user to recurring expense and inconvenience, and greatly limited the mobility of color television receivers, self-contained degaussing means were developed.

A simple degaussing means would comprise a push-button operated manual control, enabling the user to degauss the picture tube periodically as required. However, manual controls require user attention and skill and most television receivers include circuitry for automatically degaussing the picture tube each time the receiver is operated. For a complete disclosure of a typical automatic degaussing system, see Patent No. 3,249,795, granted May 3, 1966 to Leonard Dietch.

A recent trend in the color television industry has been to provide a receiver which is capable of being viewed substantially instantly after it has been turned on. Circuitry for achieving substantially instant-on operation is well-known in the television art. In vacuum tube operated receivers, it generally comprises means for supplying reduced power to the filaments while the receiver is off. When the receiver is subsequently turned on, the filaments, which have been maintained in a warm condition, allow the cathodes to emit electrons immediately. As full B+ voltage is available almost instantly, the receiver is ready for substantially instant viewing. Naturally, with the advent of transistorized television receivers, "instant-on" is inherent except for the picture tube.

Current automatic degaussing systems, such as the system disclosed in the Dietch patent, degauss when the television receiver is turned on. Degaussing is accomplished by subjecting a pair of degaussing coils adjacent the picture tube to a high initial amplitude, rapidly diminishing alternating current. In the Dietch patent, the current variation is achieved by utilizing the naturally occurring inrush charging current for the filter capactors. These capacitors charge in approximately two seconds, after which the current decreases to a minimum value near zero, until the vacuum tube cathodes are warm enough to emit electrons. The current surge through the degaussing coils produces a strong magnetic field which diminishes in magnitude while reversing polarity at the power line frequency as the current decreases, thus demagnetizing the picture tube. A delay switch shorts out the degaussing coils when the current is at its minimum value, thus preventing re-magnetization as the current increases to the steady state operating value of the receiver.

Essentials of the above prior art system are the actual and relative magnitudes of the inrush charging current to the receiver and the minimum input current. In instant-on tube type television receivers, the vacuum tubes are kept warm and the cathodes emit electrons almost immediately after the receiver is turned on. Consequently, the inrush current peak is slightly smaller and the current tapers to a steady state load condition immediately after the inrush current surge, bypassing the near zero current condition of non-instant-receivers. The same is true of sets incorporating semi-conductors rather than vacuum tubes.

There have been circuits developed for providing automatic degaussing in color television receivers capable of instant-on operation. For example, see the copending application of Van Anrooy et al., Serial No. 521,126 filed January 17, 1966 which is now U.S. Patent No. 3,333,143 issued July 25, 1967. The circuit of that application utilizes a resistive element in series with the power transformer to supply reduced filament current during non-operation of the receiver. A capacitor forming part of the filter network is isolated from the receiver during turn on, by a thermal switch operable from heat generated by the resistive element. When the instant-on receiver is turned on, the inrush current is passed through the degaussing coils and charges the isolated capacitor. As the capacitor charges, the current tapers to a minimum value near zero. The thermal switch then shorts the degaussing coils and connects the power supply to the receiver. Obvously, a timing problem is involved to insure adequate degaussing compatible with true "instant-on" operation.

This invention obviates many of the difficulties and complexities encountered in the prior art in providing a color television receiver capable of both instant-on operation and automatic degaussing, by degaussing when turning the receiver off instead of the conventional method of degaussing when the receiver is turned on. Simple mechanical switches may be used to turn the receiver on and off, (in a vacuum tube receiver, the off position being with no B+ and reduced heater current and in a semi-conductor receiver, merely providing for fast operation of the picture tube), and a separate charging capacitor is provided for achieving an inrush alternating current surge through the degaussing coils. This capacitor is maintained in its charged condition while the receiver is turned off, and is discharged only after being disconnected when the receiver is turned on.

Accordingly, the primary object of this invention is to provide means for automatically degaussing the picture tube of a color television receiver which is capable of substantially instant-on operation.

Another object of this invention is to provide means for automatically degaussing the picture tube of a color television receiver capable of instant-on operation, which means are not subject to exacting timing restrictions.

An additional object of this invention is to provide an instant-on color television receiver including automatic degaussing means operable when said receiver is turned off.

A further object of this invention is to provide a vacuum tube operated television receiver having automatic degaussing means, and including economical and simple means for maintaining the filaments warm for instant-on operation, without affecting degaussing efficiency.

A feature of this invention resides in means for subjecting the picture tube degaussing coils to a rapidly tapering alternating current of high initial amplitude during turn-off of the television receiver.

Other objects and features of this invention will be apparent upon an examination of the following description taken in conjunction with the accompanying drawing wherein a single figure illustrates a simplified schematic diagram of a tube type color television receiver incorporating the invention.

Referring to the drawing, an A.C. source 10 is connected to the primary 12 of a power transformer 14 of a conventional color television receiver. No switch is shown, although one may be provided for convenience, it being intended that the receiver normally draw some power from the line. For purposes of the invention, it is believed unnecessary to fully describe the individual components of the television receiver other than the power supply, picture tube, and degaussing circuit. Therefore the drawing should be understood to be a partial representation of the schematic diagram of a color television receiver.

Transformer 14 has a secondary winding 16 which develops relatively high potential required by the vacuum tube circuitry (signal translation means). The high potential from the secondary winding is connected to a full-wave rectifier network 18 comprising four diodes arranged in a bridge. A switch blade or element 17, engageable with either of a pair of stationary contacts **17*a* and 17*b*, is serially interposed between winding 16 and rectifier network 18. Switch element 17 is shown engaged with contact 17*a* during normal operation of the receiver. The output of rectifier network 18 is connected to another movable switch blade or element 20 which includes stationary contacts 20*a* and 20*b*. This switch element is also shown in its normal position coupling the rectifier network to a pi filter comprising a choke coil 22 and capacitors 23 and 24. The output of the filter network supplies a box 21 labeled Television Receiver which includes vacuum tube operated signal translation means. Switch elements 17 and 20** are coupled together for simultaneous movement, as indicated by the dashed line therebetween.

Power transformer 14 also has a secondary filament winding 28 for supplying low voltage A.C. current to the vacuum tube filaments or heaters. Winding 28 includes a center tap 29 for supplying less than normal voltage thereto, the tap being selected to provide "half power" operation of the heaters on "standby." A number of vacuum tube heaters, indicated by **26*a*, 26*b* . . . 26*n*, are parallelly connected and coupled to the filament winding by a third switch element 27, connectable between stationary contacts 27*a* and 27*b*. Switch element 27 is also shown in its normal position, (engaging contact 27*a*), for supplying full heater power to the filaments and is mechanically coupled to the two previously described switch elements, thereby providing simultaneous operation. Preferably a single unit three pole, double throw switch is used for elements 17, 20, and 27 and their associated contacts. Center tap 29 is connected to switch contact 27*b*** for supplying reduced A.C. power to the filaments as will be described in greater detail below.

When the television receiver is turned off, which in this description does not mean that the A.C. line is disconnected, but that the receiver B+ is not supplied (hence no sound or picture), switch elements 17, 20, and 27 are simultaneously moved from their illustrated positions, and displaced to make contact with contacts **17*b*, 20*b*, and 27*b*, respectively. Element 20 disconnects the filter network from rectifier network 18 and substitutes a separate capacitor 30. Capacitor 30** is preferably of the electrolytic type and may comprise one or more sections of a conventional multi-section can type of electrolytic capacitor.

Switch element 17, which connected the high voltage secondary winding to rectifier network 18 during operation of the receiver, now serially connects this secondary winding, through contact **17*b*, to a pair of degaussing coils 32 positioned adjacent a color television picture tube 33. The remaining end of the degaussing coils is connected to the rectifier network and the current path is completed through contact 20*b* and capacitor 30**, connected to ground.

The moment the receiver is turned off, the discharge capacitor 30 presents substantially zero impedance and a large inrush current passes through the degaussing coils. As the capacitor becomes charged, its terminal voltage increases and the current through the degaussing coils correspondingly decreases. After a number of cycles, the capacitor is fully charged and current through the degaussing coils is negligible. The capacitor is maintained in its fully charged condition while the television receiver is turned off, but is allowed to discharge through a bleeder resistor 34 in parallel therewith, when the receiver is turned on. Also, upon turning the receiver off switch element 27 and contact **27*b* connect the filament winding center tap to the filaments 26**, thereby supplying reduced A.C. power to maintain them in a warm condition in preparation for later instant-on operation.

In the disclosed embodiment, reduced filament power for operating the vacuum tubes during "standby," was provided by reducing the number of effective turns of the secondary filament winding. This approach is believed to be the most feasible from a cost standpoint, and provide maximum voltage for degaussing with a minimum number of additional components. However, it is obvious that reduced standby filament power could easily be provided by increasing the number of effective turns of the primary winding, while maintaining the filament winding constant. An additional switch section would probably be required, and it might be necessary to alter the degaussing coils or increase the voltage thereto, due to the larger transformer turns ratio.

What has been described is a simple and economical means for automatically degaussing a picture tube in a color television receiver capable of instant-on operation. Degaussing is effected upon turn off of the television receiver by charging an extra capacitor serially through the degaussing coils. Reduced power for the filament is provided by center tapping the filament winding and connecting the filaments thereto upon turning the receiver off.

It is obvious that upon study by those skilled in the art, the disclosed invention may be altered or modified both in physical appearance and construction without departing from its inventive concept. Therefore, the scope of protection to be given this invention should not be limited by the embodiment described above, but should be determined by the essential descriptions thereof which appear in the appended claims.

The embodiments of the invention in which an exclusive property or privilege is claimed are defined as follows:

1. In combination with a color television receiver having signal translation means requiring D.C. operating current and having a picture tube susceptible to external magnetic fields: picture tube demagnetizing means located adjacent said picture tube; an A.C. power source; a capacitor; rectifying means; additional means having two distinct operating modes; said additional means assuming a first of said two operating modes during turn-on of said receiver and establishing a first series circuit comprising said source, said rectifying means and said signal translation means; said additional means assuming a second of said two operating modes on turn-off of said receiver and establishing a second series circuit comprising, in the order named, said source, said demagnetizing means, said rectifying means and said capacitor; said capacitor charging and being maintained in a charged condition while said receiver is turned off, whereby said demagnetizing coils are subjected to an alternating current of decreasing amplitude.

2. The combination as set forth in claim 1 wherein said additional means comprise means bypassing said demagnetizing means, and substituting said signal translation means for said capacitor when in said first operating mode.

3. The combination as set forth in claim 1 wherein said additional means comprise a switch having multiple contacts; and including additionally, means discharging said capacitor prior to turn-off of said receiver.

4. The combination as set forth in claim 3 wherein: said capacitor is of electrolytic construction; said discharging means comprise a resistive element coupled to said capacitor; and said rectifying means comprise a plurality of semi-conductive devices arranged for full-wave rectification of said A.C. source.

5. The combination as set forth in claim 4 wherein said switch comprises two ganged sections; a first section having a movable element connected to said source, a first stationary contact connected to said demagnetizing means, and a second stationary contact connected to said rectifying means; a second section having a movable element connected to said rectifying means, a third stationary contact connected to said capacitor, and a fourth stationary contact connected to said signal translation means; the movable elements of said first and second sections making contact with said second and fourth contacts respectively thereby providing a conductive path between said source, said rectifying means and said signal translation means and establishing said first circuit, or making contact with said first and third contacts respectively thereby providing a conductive path between said source, said demagnetizing means, said rectifying means and said capacitor, and establishing said second circuit.

6. In combination with a color television receiver having signal translation means requiring D.C. operating current and A.C. heater current, and having a picture tube susceptible to external magnetic fields: picture tube demagnetizing coils located adjacent said picture tube; an A.C. power source; a capacitor; rectifying means; additional means having two distinct operating modes; said additional means assuming a first of said two operating modes during turn on of said receiver and establishing a first series circuit comprising said source, said rectifying means and said signal translation means, and also establishing a first heater circuit supplying normal heater operating current from said A.C. source; said additional means assuming a second of said two operating modes on turn off of said receiver and establishing a second series circuit comprising, in the order named, said source, said demagnetizing means, said rectifying means and said capacitor, and also establishing a second heater circuit supplying less than normal heater current from said A.C. source; said capacitor charging and being maintained in a charged condition while said receiver is turned off, whereby said demagnetizing coils are subjected to an alternating current of decreasing amplitude.

7. The combination as set forth in claim 6 wherein said capacitor is of electrolytic construction; said rectifying means comprise semi-conductive devices; and including additionally, a resistor coupled to said electrolytic capacitor for discharging it prior to turn-off of said receiver.

8. In combinaiton with a color television receiver having signal translation means requiring D.C. operating current and having a picture tube susceptible to external magnetic fields: picture tube demagnetizing coils located adjacent said picture tube; an A.C. source including a power transformer having a normally continuously energized primary winding, and a secondary winding; rectifying means; a capacitor; additional means having two distinct operating modes; said additional means assuming a first of said two operating modes during turn-on of said receiver and establishing a first series circuit comprising said secondary winding, said rectifying means and said signal translation means; said additional means assuming a second of said two operating modes on turn-off of said receiver and establishing a second series circuit comprising, in the order named, said secondary winding, said demagnetizing coils, said rectifying means and said capacitor; said capacitor charging and being maintained in a charged condition while said receiver is turned off, whereby said demagnetizing coils are subjected to an alternating current of decreasing amplitude.

9. The combination as set forth in claim 8 wherein said additional means comprise selectively conductive means disabling said demagnetizing coils and coupling said rectifying means to said signal translation means during turn-on of said receiver; said selectively conductive means enabling said demagnetizing coils and substituting said capacitor for said signal translation means on turn-off of said receiver.

10. The combination as set forth in claim 9 wherein said selectively conductive means comprise a manually operated switch having fixed contacts and a movable switch member; and wherein said capacitor is characterized by its electrolytic construction, said discharging means comprise a resistor coupled to said capacitor, and said rectifying means comprise semi-conductive devices arranged as a full-wave rectifier.

11. In a color television receiver capable of substantially instant-on operation having signal translation means requiring D.C. operating current and A.C. heater current, and having a picture tube susceptible to external magnetic fields, the combination of: picture tube demagnetizing coils located adjacent said picture tube; an A.C. source including a power transformer having a normally continuously energized primary winding, and a secondary winding; rectifying means; a capacitor; additional means having two distinct operating modes; said additional means assuming a first of said two operating modes during turn-on of said receiver and establishing a first series circuit comprising said secondary winding, said rectifying means, and said signal translation means; said additional means assuming a second of said two operating modes on turn-off of said receiver and establishing a second series circuit comprising, in the order named, said secondary winding, said demagnetizing coils, said rectifying means and said capacitor for charging and maintaining said capacitor in a charged condition while said receiver is turned off, whereby said demagnetizing coils are subjected to an alternating current of decreasing magnitude; and further means supplying normal heater power to said signal translation means during turn-on of said receiver, and less than normal heater power thereto during turn-off of said receiver for maintaining the heaters in a warm condition for substantially instant-on operation.

12. The combination as set forth in claim 11 wherein said power transformer includes additionally, a secondary heater winding; and wherein said further means include said secondary heater winding and means for varying the ratio of turns between said transformer primary winding and said secondary heater winding.

13. The combination as set forth in claim 11 wherein said power transformer includes additionally, a secondary heater winding having a tap; and wherein said further means include said secondary heater winding and a switch for energizing the entire secondary heater winding during turn-on of said receiver, and only a portion thereof during turn-off of said receiver.

14. The combination as set forth in claim 13 wherein said additional means comprise a pair of single-pole-double-throw switches ganged for simultaneous operation; a first of said switches being coupled to said secondary winding for conducting current either to said degaussing coils or to said rectifying means, and a second of said switches directing the current from said rectifying means to either said capacitor or said signal translation means; and a common connection between said degaussing coils and said rectifying means.

References Cited

UNITED STATES PATENTS

| | | | |
|---|---|---|---|
| 2,962,621 | 11/1960 | Fernald | 315—8 |
| 3,249,795 | 5/1966 | Dietch | 315—8 |
| 3,286,122 | 11/1966 | Dietch | 315—8 |
| 3,324,344 | 6/1967 | Norley | 315—8 |

JAMES W. LAWRENCE, *Primary Examiner.*

V. LAFRANCHI, *Assistant Examiner.*